United States Patent [19]

Böhm

[11] Patent Number: 5,133,001
[45] Date of Patent: Jul. 21, 1992

[54] RADIOTELEPHONE SYSTEM IN THE FORM OF A PRIVATE BRANCH EXCHANGE

[75] Inventor: Manfred Böhm, Stuttgart, Fed. Rep. of Germany

[73] Assignee: Standard Elektrik Lorenz A.G., Fed. Rep. of Germany

[21] Appl. No.: 453,818

[22] Filed: Dec. 19, 1989

[30] Foreign Application Priority Data

Dec. 23, 1988 [DE] Fed. Rep. of Germany ....... 3843565

[51] Int. Cl.⁵ ............ H04M 11/00; H04M 9/00; H04B 3/36; H04B 7/14
[52] U.S. Cl. .................................. 379/58; 379/59; 379/61; 379/62; 379/64; 455/7; 455/17; 455/31.1; 455/33.1
[58] Field of Search ............. 379/57, 58, 59, 60, 379/62, 66, 61, 63, 64; 455/33, 56, 6, 17, 18, 31, 7; 370/69.1

[56] References Cited

U.S. PATENT DOCUMENTS

| | | | |
|---|---|---|---|
| 4,528,656 | 7/1985 | Morais | 379/58 |
| 4,558,177 | 12/1985 | Corris et al. | 379/66 |
| 4,675,863 | 6/1987 | Paneth et al. | 370/50 |
| 4,718,108 | 1/1988 | Davidson et al. | 455/17 |
| 4,790,000 | 12/1988 | Kinoshita | 379/61 |
| 4,797,947 | 1/1989 | Labedz | 455/33 |
| 4,843,622 | 6/1989 | Yotsutani et al. | 379/59 |
| 4,852,148 | 7/1989 | Shibata et al. | 379/59 |
| 4,878,238 | 10/1989 | Rash et al. | 379/62 |
| 4,881,271 | 12/1989 | Yamauchi et al. | 455/56 |
| 4,918,746 | 4/1990 | Serizawa | 379/57 |
| 4,972,456 | 11/1990 | Kaczmarek et al. | 379/59 |

FOREIGN PATENT DOCUMENTS

| | | | |
|---|---|---|---|
| 0188322 | 7/1986 | European Pat. Off. | 379/58 |
| 0225607 | 12/1986 | European Pat. Off. | 379/58 |
| 2138652 | 10/1984 | United Kingdom | 379/58 |

OTHER PUBLICATIONS

"Controlled Radio Coverage Within Buildings", D. A. Palmer and A. J. Motley, Br. Telecom Technol. J., vol. 4, No. 4, Oct. 1986.

Primary Examiner—James L.051315646 Dwyer
Assistant Examiner—William D. Cumming
Attorney, Agent, or Firm—Ware, Fressola, Van Der Sluys & Adolphson

[57] ABSTRACT

A radiotelephone system in the form of a private branch exchange (12) within and/or outside one or more buildings is equipped with a plurality of mobile subscriber units (28), a plurality of transmitter/receiver units (27) capable of communicating with the subscriber units (28) by radio, and a central unit (26) cooperating with the transmitter/receiver units (27). In order that such a radiotelephone system not only permits mobile telephoning within and/or outside buildings but also can be installed later and adapted to changing requirements in a simple manner, the transmitter/receiver units (27) are arranged and designed to form not only a radio link to at least one of the subscriber units (28) but also, via respective adjacent transmitter/receiver units (27), a radio-link chain (radio bus) to the central unit (26), which has a separate transmitter/receiver unit.

12 Claims, 3 Drawing Sheets

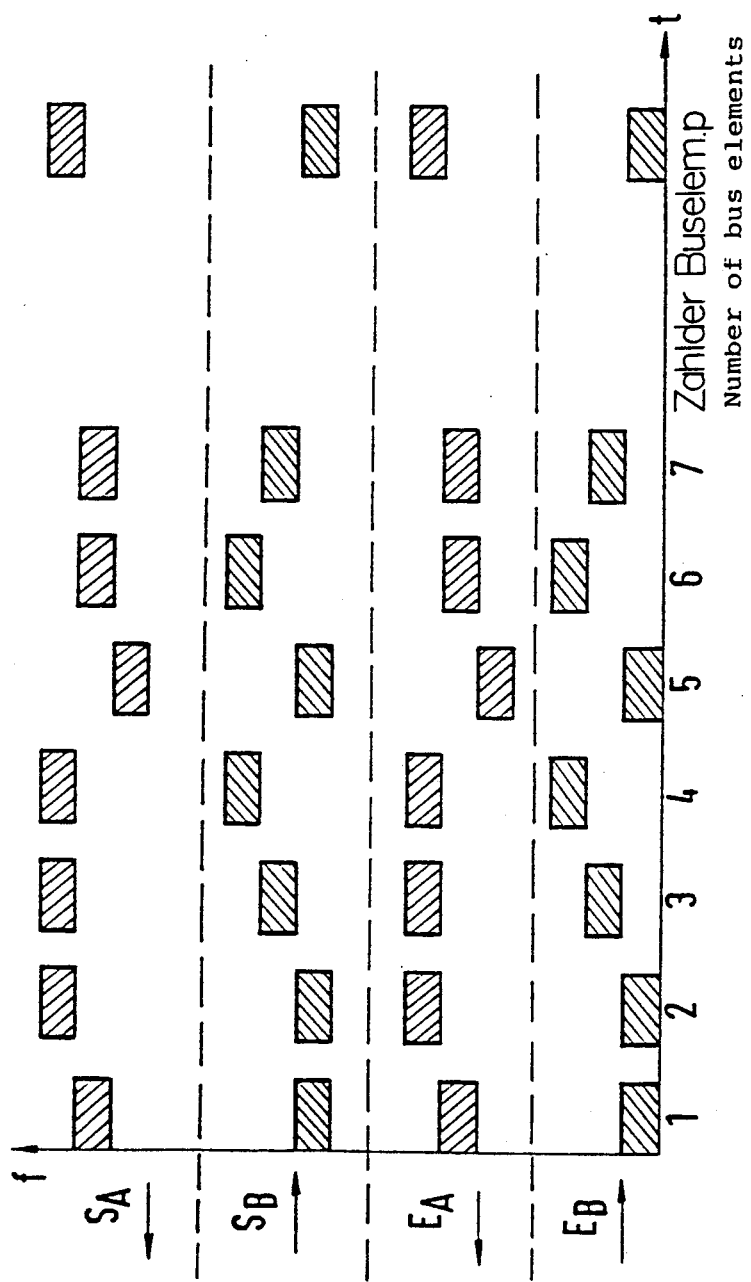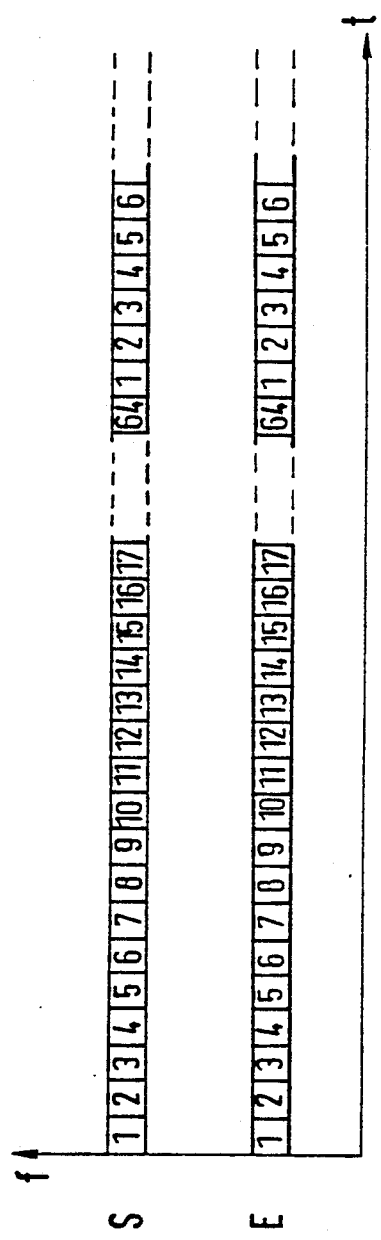
FIG. 6
FIG. 7

RADIOTELEPHONE SYSTEM IN THE FORM OF A PRIVATE BRANCH EXCHANGE

BACKGROUND OF THE INVENTION

1. Field of the Invention

The present invention relates to a radiotelephone system, particularly in the form of a private branch exchange within and/or outside one or more buildings, comprising a plurality of mobile subscriber units, a plurality of transmitter/receiver units which can be coupled with the subscriber units by radio links, and a central unit co-operating with the transmitter/receiver units.

2. Description of the Prior Art

In such a radiotelephone system, which is disclosed in EP-A-225 607, the individual transmitter/receiver units are connected with the central unit of the private branch exchange via connecting lines, so that the individual subscriber units are suitable for mobile use but are tied to the predetermined coverage of the transmitter/receiver unit. Another disadvantage of this prior art radiotelephone system lies in the fact that an expensive cable system has to be installed to connect the individual transmitter/receiver units with the central unit. This expenditure is nearly equal to that required for conventional private branch exchanges which are connected with the subscriber units by subscriber lines.

From Br Telecom Technol J Vol 4 No. Oct. 4, 1986, "Controlled Radio Coverage in Buildings", D. A. Palmer et al, a radiotelephone system is known in which the transmitter/receiver units are provided, for example, on each floor of a building, and in which these transmitter/transceiver units are connected with the individual subscriber units via leaky feeders. This system suffers basically from the same drawbacks as those mentioned for the system referred to above since a fixed wiring system is required.

SUMMARY OF THE INVENTION

It is the object of the present invention to provide a radiotelephone system of the above kind which not only permits mobile telephoning within and/or outside buildings but also is easy to install even later and readily adaptable to changing requirements.

This object is attained by a radiotelephone system having a plurality of mobile subscriber units, a plurality of transmitter/receiver units which can be coupled with the subscriber units by radio links, and a central unit cooperating with the transmitter/receiver units, which units are arranged and designed to form not only a radio link to at least one of the subscriber units, but also, via respective adjacent transmitter/receiver units, a radio-link chain to the central unit, which has a separate transmitter/receiver unit.

According to the invention, the permanent connection of the individual transmitter/receiver units with the central unit of, e.g., a private branch exchange is thus replaced by a radio bus, which eliminates the need for expensive wiring systems and permits quick and inexpensive changes in the telephone system if changes are made in the layout of the rooms of the building. It is also possible to adapt the radiotelephone system to changing requirements in a simple manner, e.g., with regard to meetings-at which the participants can be provided with cordless telephones as subscriber units. In that case, it is also possible to take into account changes in the size of the available rooms.

For further simplification, particularly with respect to equipment design, the transmitter/receiver units are of uniform design and are controllable from the central unit with respect to carrier frequency and/or channel number and/or transmitting power.

It is advantageous to operate the units or equipment in a time-division multiplex mode, wherein the transmitter/receiver unit and the subscriber unit operate in a TDMA mode.

A simple and advantageous solution is obtained if the transmitter/receiver units operate with three carrier-frequency pairs, a first of which is used for duplex communication with the respective subscriber unit, while the two others are used for duplex communication with two adjacent transmitter/receiver units, and the subscriber unit operates with a single carrier-frequency pair.

Even greater mobility results if the transmitter/receiver unit is provided with a power supply for connection to an element of the electric building wiring system, as is the case in a further embodiment of the present invention. In that case, it may be advantageous to provide the transmitter/receiver units with conventional power plugs and to use existing receptable outlets of the electric building wiring system. An even simpler and more advantageous solution is obtained if the power supply is provided with a base for a conventional lamp socket since simultaneously with the electric connection, mechanical support is provided for the transmitter/receiver unit.

If the radio telephone system is used in a private branch exchange connected to one or more central-office trunk and/or central-office general equipment, the central unit of the private branch exchange is provided with a controller for the radio bus, said controller being connected to the separate transmitter/receiver unit, it may be advantageous to use conventional private branch exchanges or, if a private branch exchange with permanently connected subscriber units is already present, to convert such a private branch exchange to the radiotelephone system according to the invention or to expand it into such a system in a suitable manner.

When the transmitter/receiver units of the radio bus are used in a quasi-optical (line-of-sight) path, optimum radio communication quality is achieved.

DESCRIPTION OF THE DRAWINGS

Further details of the invention will become apparent from the following description of an embodiment of the invention taken in conjunction with the accompanying drawings, in which:

FIG. 6 is a simplified diagram of the signal format for the individual transmitter/receiver units of the radiotelephone system of FIG. 1, and FIG. 7 is a simplified diagram of the signal format for a subscriber unit as used in the radiotelephone system of FIG. 1.

DETAILED DESCRIPTION OF THE PREFERRED EMBODIMENT

Figure 1:
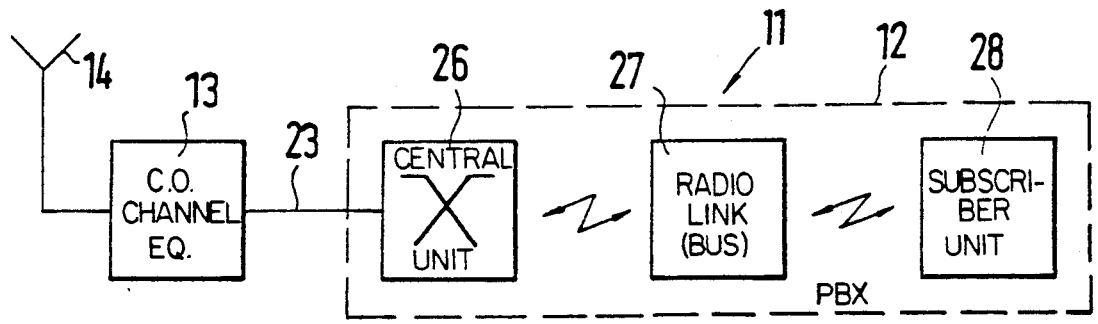
FIG. 1 is a block diagram of a preferred embodiment of a radiotelephone system in accordance with the invention.
Figure 2:
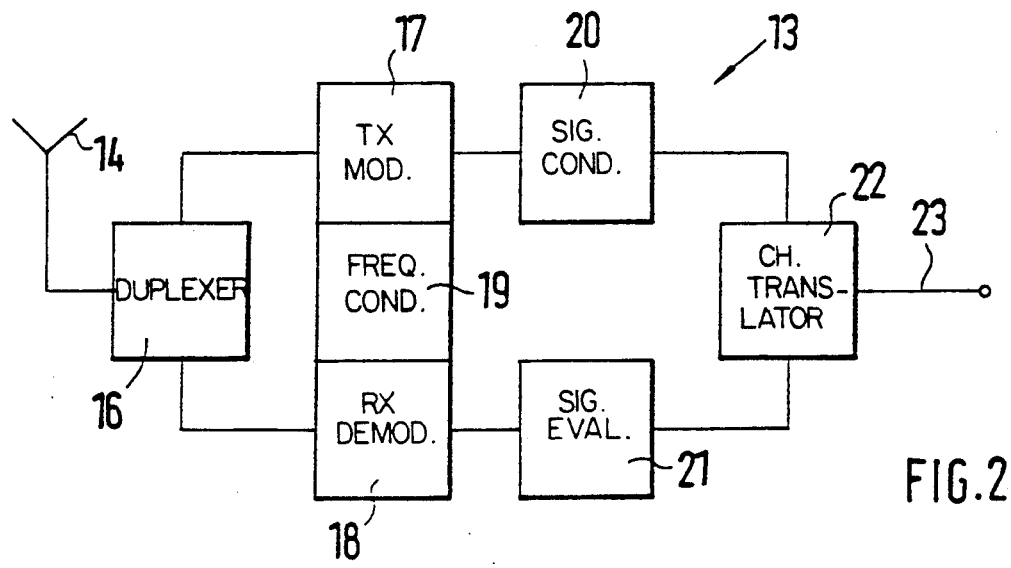
FIG. 2 is a block diagram of a central-office-channel equipment as used in the radio-telephone system of FIG. 1.

The radiotelephone system shown in FIG. 1 in the form of a private branch exchange is connected to a central-office-channel equipment 13 which can receive and transmit radio signals, which are transmitted via the public radio network, via an antenna 14 in the known manner. This public mobile communication network is, for example, the C-net, which is currently used in Germany and operates in the 450-MHz range, or the future D-net, which will operate in the 900-MHz range. As shown in FIG. 2, the central-office-channel equipment 13, which can receive 1 to n radio channels in given carrier-frequency ranges, is of conventional design and a duplexer 16, a transmitter/modulator unit 17, a receiver/demodulator unit 18 connected to the duplexer 16, a frequency-conditioning unit 19, and a signal-conditioning unit 20 and a signal-evaluating unit 21 which are connected to the transmitter/modulator unit 17 and the receiver/demodulator unit 18, respectively, and have their other ends coupled to a channel translator 22 which is connected to the private branch exchange 12 of the radiotelephone system in accordance with the invention. On the connecting line 23, 1 to n PCM central-office channels can be transmitted.

The radiotelephone system, shown and designed here as a private branch exchange 12, has a central unit 26 which is connected, or connectable to permit two-way communication, via a radio-link chain 27 within and/or outside one or more buildings to a subscriber arrangement 28, which is present there. The radio-link chain will be referred to as "radio bus".

Figure 4:
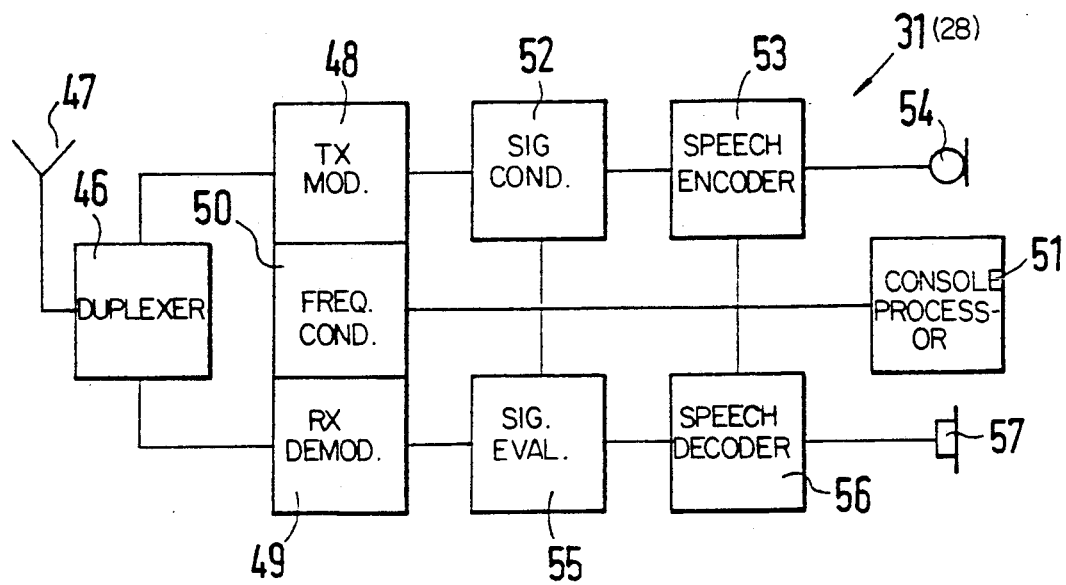
FIG. 4 is a block diagram of a subscriber unit as used in the radiotelephone system of FIG. 1.
Figure 5:
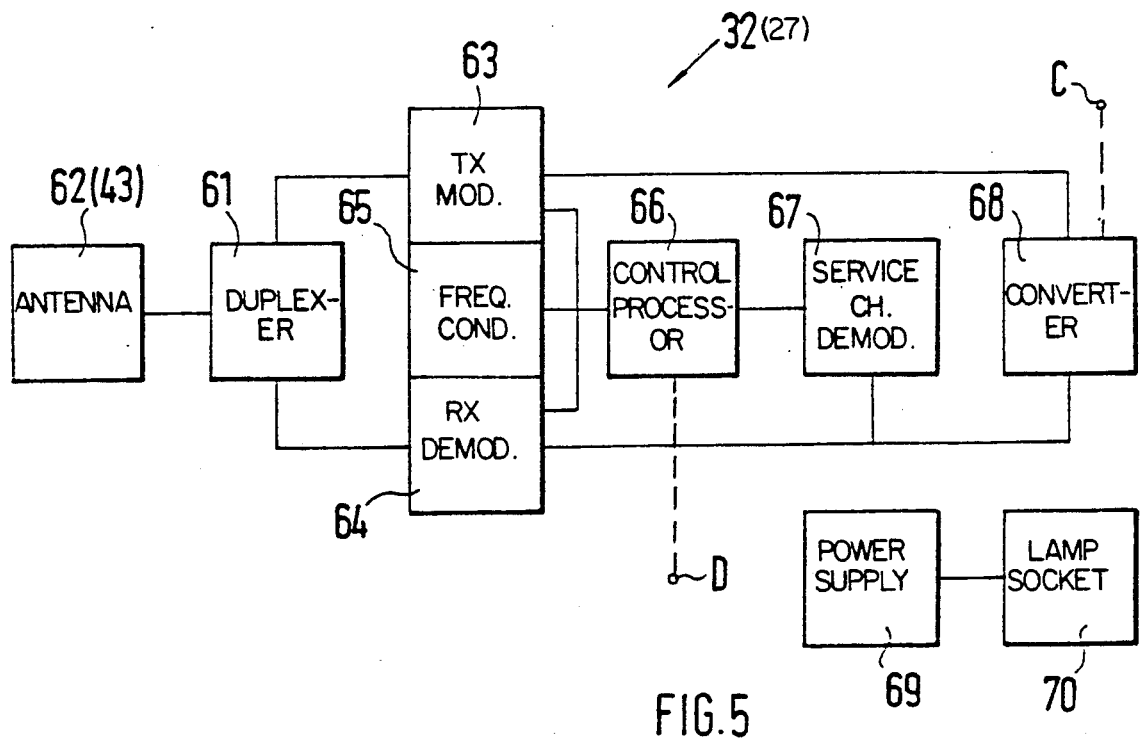
FIG. 5 is a block diagram of a transmitter/receiver unit of the radio bus for the radiotelephone system of FIG. 1.

The subscriber arrangement 28 consists of a plurality of subscriber units 31 as shown in FIG. 4, which are designed as conventional cordless telephones. These subscriber units 31 are thus mobile and are present at different points within the radiotelephone system. The radio bus 27 consists of a plurality of radio-bus elements 32 of essentially identical construction as are shown in FIG. 5. The radio-bus elements 32 are distributed within the radiotelephone system or within and/or outside said one or more buildings in such a way that essentially a quasi-optical (line-of-sight) path exists between adjacent radio-bus elements 32. However, depending on the materials used for walls and the like, it is frequently not absolutely necessary that there should be a line-of-sight path between the individual radio-bus elements 32. For the transmitter/receive mode, it is then necessary for the respective subscriber unit 31 to be located within the coverage of a radio-bus element 32 which enters into two-way radio communication with an adjacent radio-bus element 32 which, in turn, enters into two-way radio communication with an adjacent radio-bus element 32, etc.

Figure 3:
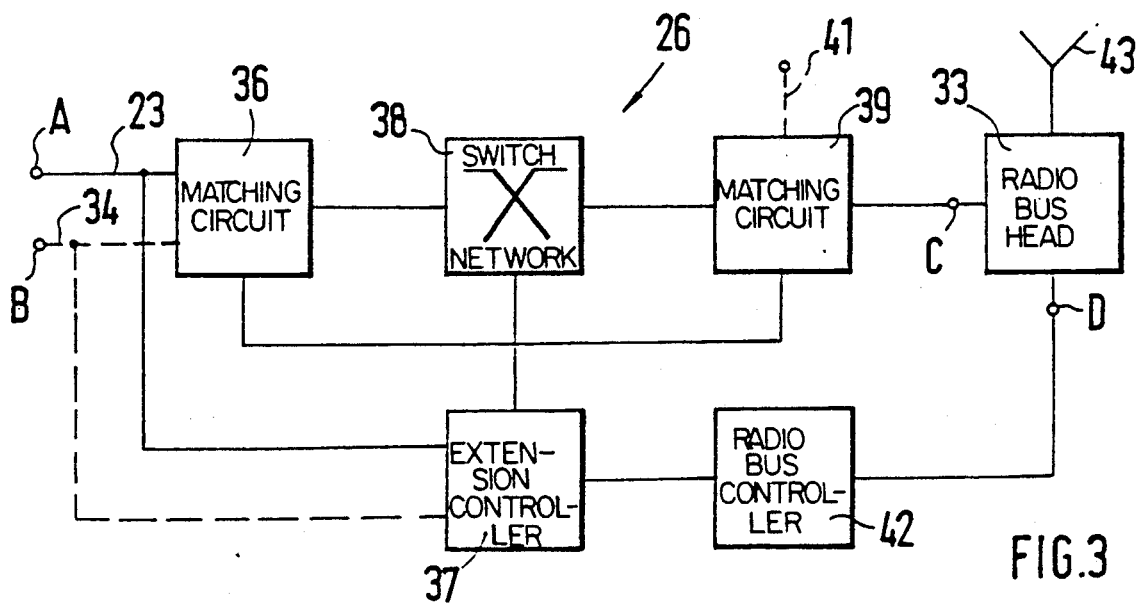
FIG. 3 is a block diagram of the central unit of a private branch exchange for the radiotelephone system of FIG. 1.

FIG. 3 shows the central unit 26 of the private branch exchange 12 of the radiotelephone system. As can be seen, the private branch exchange 12, besides being connected at the terminal A to the central-office-channel equipment 13 for radio communication via the public mobile communication network, may also be connected to a trunk equipment (not shown) at terminal B, so that incoming and outgoing calls can also be transmitted via the trunk network. The central unit 26 has a first matching circuit 36 and an extension controller 37 which are connected both to the line 23 coming from the central-office-channel equipment (terminal A) and to the line 34 coming from the trunk equipment (terminal B). The first matching circuit 36 is connected directly and via a switching network 38 to a second matching circuit 39, to which extension telephones may be permanently connected via lines 41. The extension controller 37, which is also connected to the switching network 38, is coupled to a radio-bus controller 42. A radio-bus head 33, which is similar in design to a radio-bus element 32, is connected both to the second matching circuit 39 (at a terminal C) and to the radio-bus controller 42 (at a terminal D), and has an antenna 43.

As shown in FIG. 4, the cordless subscriber unit 31 is of conventional design and has a duplexer 46 which is connected at one end to a transmitting/receiving antenna 47 and at the other end both to a transmitter/modulator unit 48 and to a receiver/demodulator unit 49, between which there is a frequency-conditioning unit 50 connected to a console processor 51. The transmitter/modulator unit 48 is connected to a microphone 54 via a signal-conditioning unit 52 and a speech encoder 53. Correspondingly, the receiver/demodulator unit 49 is connected to an ear piece 57 via a signal-evaluating unit 55 and a speech decoder 56.

As shown in FIG. 5, each radio-bus element 32 has a duplexer 61 which is connected at one end to an antenna 62 and at the other end both to a transmitter/modulator unit 63 and to a receiver/demodulator unit 64, between which there is a frequency-conditioning unit 65 which is connected via a control processor 66 to a service-channel demodulator 67. The transmitter/modulator unit 63 and the receiver/demodulator unit 64 are interconnected directly and via a converter 68. The receiver/demodulator unit 64 is also connected to the service-channel demodulator 67.

Each radio-bus element 32 of the radio bus 27 between the subscriber arrangement 28 and the central unit 26 is provided with a power-supply unit 69 having a conventional screw base via which the radio-bus element 32 can be electrically connected with lamp sockets 70 of the electric building wiring system. The radio-bus element 32 can thus be inserted into any lamp socket 70, so that not only electric connection but also mechanical support are provided for the radio-bus element 32.

The radio-bus head 33, described in connection with the central unit 26, is identical in construction to the radio-bus element 32 of FIG. 5 except that the power-supply unit 69 is permanently connected with the power supply of the central unit 26 instead of being connectable with a socket 70. In addition, as can be seen in FIG. 3, the control processor 66 (FIG. 5) is connected at the terminal D to the radio-bus controller 42 (FIG. 3), and the converter 68 (FIG. 5) is connected at the terminal C to the second matching circuit 39 (FIG. 3).

Two-way communciation between a subscriber from outside the radiotelephone system and a mobile radio subscriber within the radiotelephone system takes place as follows. The signal coming from outside is transferred through the central-office-channel equipment 13 or trunk equipment into the central unit 26 of the private branch exchange 12 or the radiotelephone system and is transmitted by radio from the radio-bus head 33 of the a central unit 26 to the nearest radio-bus element 32, thence to the nearest radio-bus element 32, etc., until it reaches that radio-bus element 32 within whose coverage the dialled subscriber unit 31 is located. The transmission of signals from the respective subscriber unit 31 to an external subscriber is reverse, i.e., from the subscriber unit 31 to the nearest radio-bus element 32, thence to the nearest radio-bus element 32, etc., up to the central unit 26 and thence to the outside.

Two-way communication between two subscriber units 31 within the radiotelephone system takes place analagously via the respective radio-bus elements 32 and the central unit 26 located between said elements.

If the radiotelephone system 11 is located within or outside a single building, it may generally be sufficient to provide one radio-bus head 33 which is permanently connected with the central unit 26. If two or more buildings are connected to the radiotelephone system, or the external subscriber station is too far away, it may be advantageous to provide in or outside the other building or each of the other buildings an additional radio-bus head 33 as a starting point for the radio-link chain in the form of the radio-bus 27 and to permanently connect this additional radio-bus head 33 to the central unit 26 via a connecting line.

FIGS. 6 and 7 show the TDMA signal formats for the radio-bus element 32 and the subscriber unit 31, respectively, the latter being designed as a telephone operating in the time-division multiplex mode. As shown in FIG. 6, each radio-bus element 32 can process three different groups of frequency pairs, one of which serves for transmission to and reception from one or more subscriber units 31, while the two others serve for transmission to and reception from the two adjacent radio-bus elements 32.

FIG. 7 shows that the transmission- and reception-frequency ranges of a subscriber unit 31 having a single pair of frequencies have 64 channels. It is also possible to provide the identical subscriber units 31 with more than one carrier frequency (not shown). The same applies analogously to the radio-bus elements 32. In these cases, the frequencies, channels, and transmitting powers of the radio-bus elements 32 and the subscriber units 31 are advantageously set from the central unit 26 via a service channel.

What is claimed:

1. A radiotelephone system, particularly in the form of a private branch exchange, including a plurality of mobile subscriber units, a plurality of transmitter/receiver units coupled with the subscriber units by radio links, and a central unit cooperating with the transmitter/receiver units, characterized in that the transmitter/receiver units are arranged and designed to form not only a radio link to at least one of the subscriber units, but also, via respective adjacent transmitter/receiver units, a radio-link chain to the central unit which has a separate transmitter/receiver unit, said transmitter/receiver units each operating with three carrier frequency pairs, a first of which is used for duplex communication with the respective subscriber unit, while the other two are used for duplex communication with two adjacent transmitter/receiver units of the radio-link chain.

2. A radiotelephone system as claimed in claim 1, characterized in that the transmitter/receiver unit and the subscriber unit operate in a TDMA mode.

3. A radiotelephone system as claimed in claim 2, characterized in that the subscriber unit operates with a single carrier-frequency pair.

4. A radiotelephone system as claimed in claim 3, characterized in that the transmitter/receiver unit is provided with a power supply for connection to an element of the electric building wiring system.

5. A radiotelephone system as claimed in claim 4, characterized in that the power supply is provided with a base for a conventional lamp socket.

6. A radiotelephone system as claimed in claim 5, characterized in that the transmitter/receiver units of the radio-bus are used in a quasi-optical, line-of-sight path.

7. A radiotelephone system as claimed in claim 2, characterized in that the transmitter receiver unit is provided with a power supply for connection to an element of the electric building wiring system.

8. A radiotelephone system as claimed in claim 7, characterized in that the transmitter/receiver units of the radio-bus are used in a quasi-optical, line-of-sight path.

9. A radiotelephone system as claimed in claim 1, characterized in that the transmitter/receiver unit is provided with a power supply for connection to an element of the electric building wiring system.

10. A radiotelephone system as claimed in claim 9, characterized in that the power supply is provided with a base for a conventional lamp socket.

11. A radiotelephone system as claimed in claim 10, characterized in that the transmitter/receiver units of the radio-bus (27) are used in a quasi-optical, line-of-sight path.

12. A radiotelephone system as claimed in claim 1, characterized in that the transmitter/receiver units of the radio-bus (27) are used in a quasi-optical, line-of-sight path.

* * * * *